(12) United States Patent
Maeng et al.

(10) Patent No.: US 9,015,383 B2
(45) Date of Patent: Apr. 21, 2015

(54) METHOD AND APPARATUS FOR CHANGING INPUT TYPE IN INPUT SYSTEM USING UNIVERSAL PLUG AND PLAY

(75) Inventors: Je-Young Maeng, Suwon-si (KR); Ki-Chul Park, Suwon-si (KR); Joo-Yeol Lee, Seongnam-si (KR); Se-Hee Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 649 days.

(21) Appl. No.: 12/942,605

(22) Filed: Nov. 9, 2010

(65) Prior Publication Data
US 2011/0113169 A1     May 12, 2011

(30) Foreign Application Priority Data

Nov. 9, 2009 (KR) .................. 10-2009-0107316
Mar. 23, 2010 (KR) .................. 10-2010-0025812

(51) Int. Cl.
    *G06F 13/38*     (2006.01)
    *G06F 3/00*     (2006.01)
    *H04L 29/06*     (2006.01)
    *H04L 12/12*     (2006.01)

(52) U.S. Cl.
    CPC .............. *H04L 69/16* (2013.01); *H04L 12/12* (2013.01); *Y02B 60/34* (2013.01)

(58) Field of Classification Search
None
See application file for complete search history.

(56) References Cited

U.S. PATENT DOCUMENTS 6,032,147 A * 2/2000 Williams et al. ...................... 1/1
7,730,223 B1 * 6/2010 Bavor et al. ........................ 710/8
2003/0020757 A1 * 1/2003 Aratani et al. ................. 345/790
2003/0101294 A1 * 5/2003 Saint-Hilaire et al. .......... 710/11
2005/0021714 A1    1/2005 Yook et al.
2005/0128048 A1 * 6/2005 Krzyzanowski et al. .... 340/3.71
2005/0138179 A1 * 6/2005 Encarnacion et al. ........ 709/227
2005/0198222 A1 * 9/2005 Kohinata et al. .............. 709/220
2005/0235334 A1 * 10/2005 Togashi et al. ................ 725/117
2005/0283814 A1 * 12/2005 Scott et al. ..................... 725/115
2006/0041927 A1 * 2/2006 Stark et al. ..................... 725/139
2006/0155980 A1    7/2006 Bodlaender (Continued)

FOREIGN PATENT DOCUMENTS

CN        1748400      3/2006
EP        1 659 739      5/2006

(Continued)

OTHER PUBLICATIONS

Craig Ranta et al., "Human Interface Device (HID) Profile Version 1.0 Adopted", Bluetooth SIG, XP-002697882, May 22, 2003.

*Primary Examiner* — Michael Sun
(74) *Attorney, Agent, or Firm* — The Farrell Law Firm, P.C.

(57) ABSTRACT

A method and apparatus for changing an input type in an input system using UPnP are provided. A control point requests input capability information of input devices, which are to perform input and receives the input capability information. The control point sets up a session by determining a receiving device for receiving an input signal and a transmitting device for transmitting the input signal, using the received input capability information. The receiving device receives input data from the transmitting device, and if an input type of the receiving device is changed, the receiving device transmits information about the changed input type to the transmitting device and receives a report descriptor including information about a format of input data according to the changed input type from the transmitting device.

18 Claims, 10 Drawing Sheets

(56) References Cited

U.S. PATENT DOCUMENTS

| | | |
|---|---|---|
| 2007/0112714 A1* | 5/2007 | Fairweather .................... 706/46 |
| 2008/0005358 A1* | 1/2008 | Kwon et al. ................... 709/248 |
| 2008/0209036 A1* | 8/2008 | Sakamoto et al. ............ 709/224 |
| 2008/0243998 A1 | 10/2008 | Oh et al. |
| 2009/0009808 A1* | 1/2009 | Maekawa et al. ............ 358/1.15 |
| 2009/0074040 A1* | 3/2009 | Lida et al. .................... 375/220 |
| 2009/0161579 A1 | 6/2009 | Saaranen et al. |
| 2009/0222593 A1* | 9/2009 | Murai et al. .................... 710/12 |
| 2009/0303926 A1* | 12/2009 | Den Hartog et al. ......... 370/328 |
| 2010/0050214 A1* | 2/2010 | Funabiki et al. ................ 725/81 |

FOREIGN PATENT DOCUMENTS

| | | |
|---|---|---|
| KR | 1020100021358 | 2/2010 |
| WO | WO 2008/066574 | 6/2008 |

\* cited by examiner

```xml
<?xml version="1.0" encoding="UTF-8"?>
<deviceInputCapability xmlns="urn:schemas-upnp-org:telephony:ics:dic"
   xmlns:xsi='http://www.w3.org/2001/XMLSchema-instance"
   xsi:schemaLocation="urn:schemas-upnp-org:telephony:ics:dic"
   <http://www.upnp.org/schemas/telephony/ics-v1-dic.xsd>
   <capability role="sender">
      <countryCode>contry code of input device<contryCode>
      <LANGID>LANGID of input device <LANGID>
      <inputModeList>
         <inputMode id="1">
            <inputDeviceType>Simple type</inputDeviceType>
            <inputDeviceSubClass>USB device class</inputDeviceSubClass>
            <inputdataformat type="USB_RD">
               <ReportDescriptor>USB report Descriptor</ReportDescriptor>
            </inputdataformat>
            <transportProtocol>BT HID REQUEST</transportProtocol>
            <supportSecureChannel>True or False</supportSecureChannel>
         <inputMode>

<inputMode id="2">
            <inputDeviceType>Simple type</inputDeviceType>
            <inputDeviceSubClass>USB device class</inputDeviceSubClass>
            <inputdataformat type="USB_DeFAULT">blank</inputdataformat>
            <transportProtocol>BT HID REQUEST<transportProtocol>
            <supportSecureChannel>True or False</supportSecureChannel>
         <inputMode>
         ..................
      </inputModeList>
   </capability>
   <capability role="receiver">
      ...................
   </capability>
</deviceInputCapability>
```

FIG.7

```xml
<?xml version="1.0" encoding="UTF-8"?>
<deviceInputCapabilityxmlns="urn:schemas-upnp-org:telephony:ics:dic"
   xmlns:xsi="http://www.w3.org/2001/XMLSchema-instance"
   xsi:schemaLocation="urn:schemas-upnp-org:telephony:ics:dic"
   <http://www.upnp.org/schemas/telephony/ics-v1-dic.xsd>
   <capability role="sender">
      <inputModeList>

<inputMode>
         <inputDeviceType>Simple type</inputDeviceType>
         <inputDeviceSubClass>USB device class</inputDeviceSubClass>
         <inputdataformat type="vendor defined value">
           Additional element for describe input data format
         </inputdataformat>
         <transportProtocol>vendor defined value</transportProtocol>
           Additional element for describe inputMode
         <inputMode>

</inputModeList>
   </capability>
   <capability role="receiver">
      ....................
   </capability>
</deviceInputCapability>
```

FIG.8

```xml
<?xml version="1.0" encoding="UTF-8"?>
<connectionInfo>
   xmlns="urn:schemas-upnp-org:telephony:ics:cif"
   xmlns:xsi="http://www.w3.org/2001/XMLSchema-instance"
   xsi:schemaLocation="urn:schemas-upnp-org:telephony:ics:cif
<http://www.upnp.org/schemas/telephony/ics-v1-cif/xsd>
<sessionParameters transportProtocol=" BT HID REQUEST" >
          <deviceRole>role of the device<deviceRole>
          <RDtransportPort>port Num for control channel<RDtransportPort>
          <controlPortNum>port Num for control channel</controlPortNum>
          <interruptPortNum>port Num for interrupt channel</interruptPortNum>
          <secureControlPortNum>
              Port Num for control secure channel
          </secureControlPortNum>
          <secureInterruptPortNum>
             Port Num for interrupt secure channel
          </secureInterruptPortNum>
          Additional element for describe user defined connectionInfo
   </sessionParameters>
</connectionInfo>
```

FIG.9

```
<?xml version="1.0" encoding="UTF-8"?>
<connectionInfo>
    xmlns="urn:schemas-upnp-org:telephony:ics:cif"
    xmlns:xsi="http://www.w3.org/2001/XMLSchema-instance"
    xsi:schemaLocation="urn:schemas-upnp-org:telephony:ics:cif
<http://www.upnp.org/schemas/telephony/ics-v1-cif/xsd>
<sessionParameters transportProtocol="vendor defined value">
        <deviceRole>role of the device<deviceRole>
        Additional element for describe vendor defined connectionInfo
    </sessionParameters>
</connectionInfo>
```

FIG.10

METHOD AND APPARATUS FOR CHANGING INPUT TYPE IN INPUT SYSTEM USING UNIVERSAL PLUG AND PLAY

PRIORITY

This application claims priority under 35 U.S.C. §119(a) to Korean Patent Applications filed in the Korean Intellectual Property Office on Nov. 9, 2009 and Mar. 23, 2010 and assigned Serial Nos. 10-2009-0107316 and 10-2010-0025812, respectively, the entire disclosures of which are incorporated herein by reference.

BACKGROUND OF THE INVENTION

1. Field of the Invention

The present invention relates generally to a Universal Plug and Play (UPnP) protocol, and more particularly, to a method and apparatus for changing an input type in an input system using UPnP.

2. Description of the Related Art

Users of a Personal Computer (PC), a laptop computer, a Personal Digital Assistant (PDA), etc. use various types of input devices to control those computing or mobile devices. The input devices include a general input device such as a keyboard or a mouse, an input device such as a joystick or a game pad used for video games, and an input device such as a stylus for a professional designer. There are numerous types of input devices for various purposes.

To receive input data transmitted by various input devices, a host device should be equipped with various drivers, which can receive and interpret the input data. Namely, when an input device is connected to a host device, the host device uses input data by interpreting the input data through a driver. Since the host device does not know which input device is to be connected to it, it must include all types of device drivers or a user must install a driver suitable for the connected input device.

To solve such a problem, the Universal Serial Bus (USB) standard has been used, which is designed to be used even if a new type of an input device is connected. The USB standard divides existing input devices into classes according to types of the input devices. Each class driver manages a specific class device. In particular, a class such as a Human Interface Device (HID) transmits a report descriptor, which defines a data format to be transmitted by an input device.

The USB input device is advantageous in that various input devices can be controlled using a single port and a class driver. However, it is restricted to a wired connection. To overcome such a limitation, the Bluetooth® Special Interface Group (SIG) and USB standard group have developed standard techniques such as Bluetooth® HID profile and Wireless USB, thereby providing a method which can wirelessly connecting an HID to a host device. However, such techniques simply extend the conventional wired function to a wireless environment and include neither considerations of a wireless or network environment nor any new functions.

Recently, mobile devices such as cellular phones and PDAs can process information more quickly compared to conventional devices and operate in an environment which can easily access a network. Based on this trend, the UPnP telephony Working Committee (WC) has defined a service that may use one device as an input device of another device by using a network.

SUMMARY OF THE INVENTION

An aspect of the present invention is to address at least the above-mentioned problems and/or disadvantages and to provide at least the advantages described below. Accordingly, an aspect of the present invention provides a method and apparatus for quickly changing an input type while an input operation is performed in an input system using UPnP.

In accordance with an aspect of the embodiments of the present invention, a method for changing an input type in an input system using UPnP includes requesting, by a control point, input capability information of input devices which are to perform input and receiving the input capability information; setting up a session, by the control point, by determining a receiving device for receiving an input signal and a transmitting device for transmitting the input signal, using the received input capability information; receiving, by the receiving device, input data from the transmitting device; and if an input type of the receiving device is changed, transmitting, by the receiving device, information about the changed input type to the transmitting device, and receiving a report descriptor including information about a format of input data according to the changed input type from the transmitting device.

In accordance with another aspect of the embodiments of the present invention, an input system using UPnP includes a transmitting device for receiving input from a user and transmitting input data, a receiving device for receiving input data from the transmitting device and performing an operation according to the input data, and a control point for requesting input capability information and receiving the input capability information from input devices which are to perform input, and setting up a session by determining the receiving device for receiving an input signal and the transmitting device for transmitting the input signal, using the received input capability information, wherein, if an input type is changed, the receiving device transmits information about the changed input type to the transmitting device and receives a report descriptor including information about a format of input data according to the changed input type from the transmitting device.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF THE EMBODIMENTS OF THE PRESENT INVENTION

Reference will now be made in detail to the embodiments of the present invention with reference to the accompanying drawings. The following detailed description includes specific details in order to provide a thorough understanding of the present invention. However, it will be apparent to those skilled in the art that the present invention may be practiced without such specific details.

Figure 1:
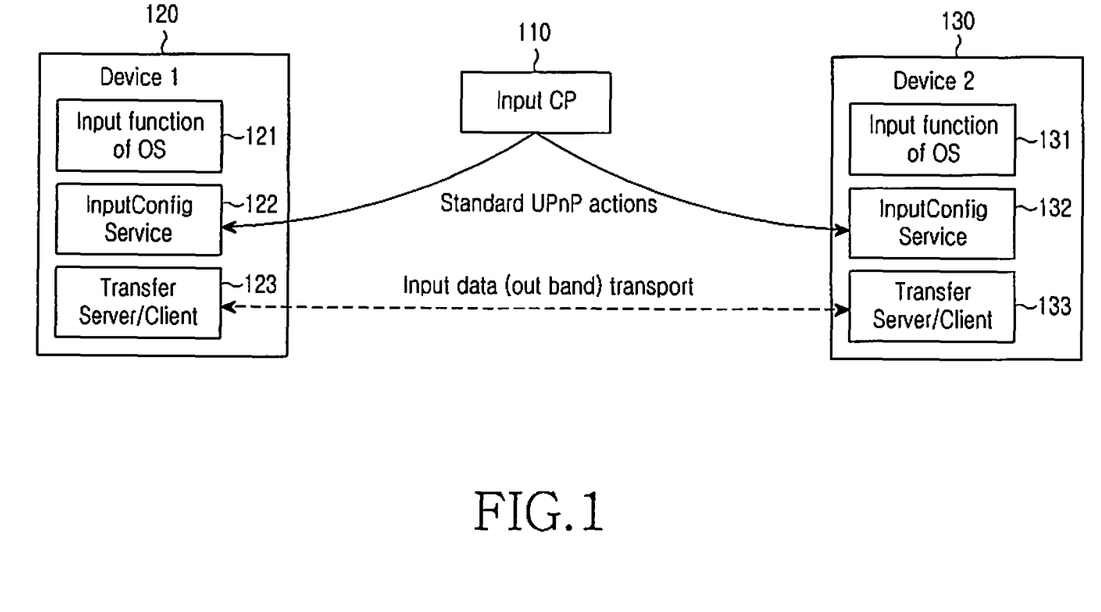
FIG. 1 is a block diagram of an input system using UPnP, to which the present invention may be applied.

FIG. 1 is a block diagram of an input system using UPnP, to which the present invention is applied. The input system using UPnP includes two input devices 120 and 130 and an input Control Point (CP) 110. Input devices 120 and 130 include input functions 121 and 131 of an Operating System (OS), input configuration services 122 and 132, and transfer servers/clients 123 and 133. The transfer servers/clients 123 and 133 operate as servers or clients and transmit input information. CP 110 discovers the input configuration services 122 and 132 on a network and may set the kinds of input devices, input types and necessary information, which can be processed by each input device. One of the input configuration services 122 and 132 transmits input data and the other input configuration service receives the input data. CP 110 transmits, to each service, a format and transmission method of input data to be used to ensure interoperability between data to be transmitted by a transmitting side and data to be received by a receiving side. The input type is described in a capability document, which indicates the input capability of each input device. The capability document may describe various kinds of input devices and information related to characteristics of devices. Each element described in the capability document is being standardized in the UPnP telephony WC.

Figure 2:
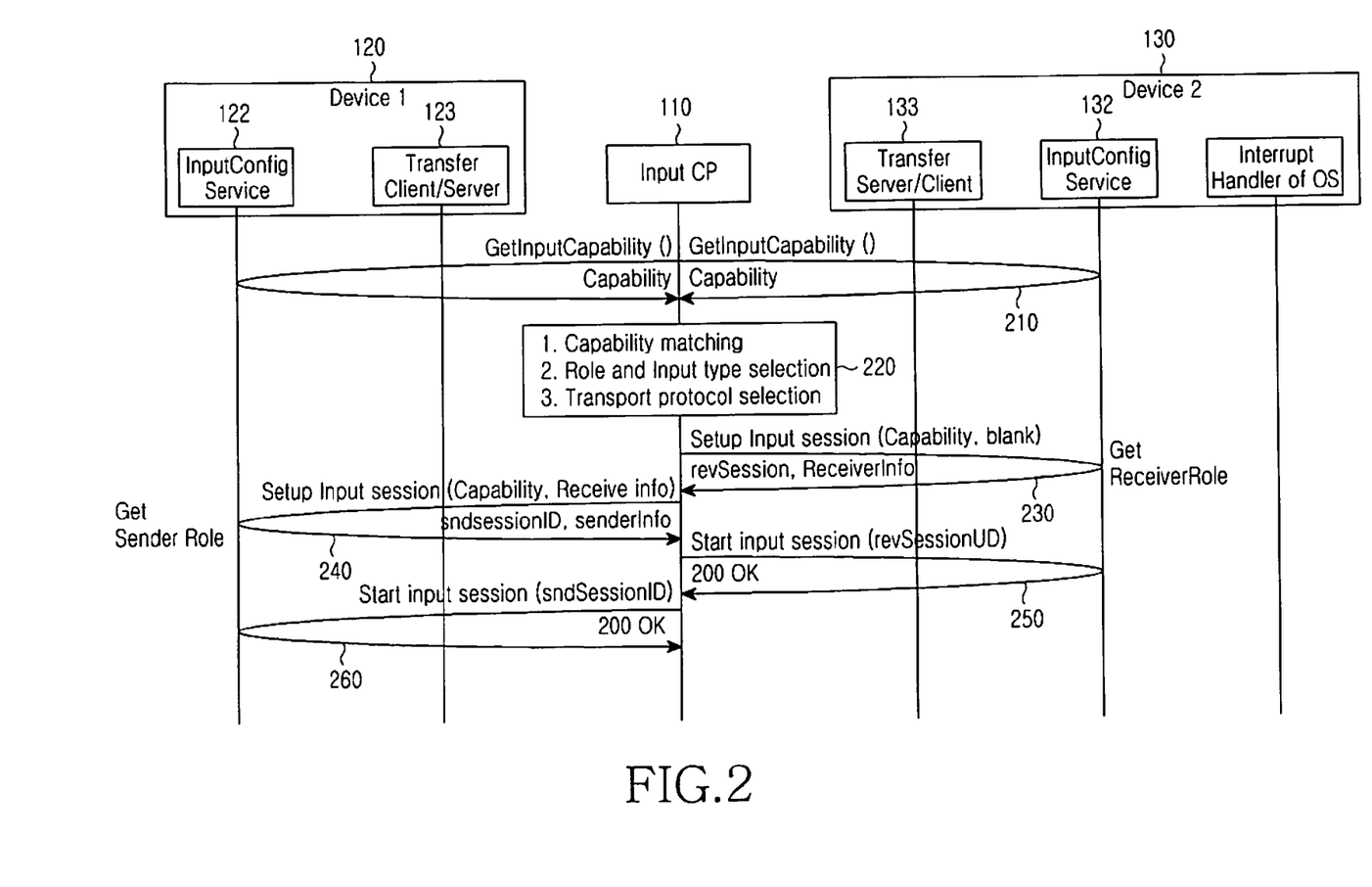
FIG. 2 is a diagram illustrating an input operation in an input system using UPnP.

FIG. 2 is a diagram illustrating an input operation in an input system using UPnP. Referring to FIG. 2, CP 110 receives capabilities of the input devices 120 and 130 using a UPnP action such as GetInputCapability( ) from the input configuration services 122 and 132 in step 210. CP 110 determines roles of the input devices 120 and 130 and transport protocols in step 220, based on the received capabilities. CP 110 generates sessions of the input devices 120 and 130 using a UPnP action such as SetupinputSession( ) in steps 230 and 240. CP 110 starts sessions of input devices 120 and 130 using a UPnP action such as StartInputSession( ) to start the transmission of input data between the two devices in steps 250 and 260. The session refers to a logic connection between input devices and may be controlled through a UPnP protocol.

A conventional USB or Bluetooth® HID input type has the following problems.

First, USB and Bluetooth® input types require a plurality of interfaces for input. For example, upon surfing the web on a notebook computer, a host PC should include a Bluetooth® or USB interface for receiving input, in addition to a network interface for using the web. Moreover, an input type of a used device and a type of input data cannot be changed. For example, if a user desires to use a USB mouse as a USB keyboard, there is no way to achieve such use. This is a problem inherent in the USB and Bluetooth® standards. If there is a device having a specific purpose, the standard is designed to connect the device having that specific purpose to a host device. Namely, the purpose of a device is fixed and, even if the purpose of the device changes, there is no method to adjust to its new purpose.

In a UPnP input configuration service, which is being standardized, there is no method for transmitting input data to a network. Accordingly, the required information and constituent elements for this method do not exist. A currently implemented method is discovering an input device, checking a capability of the discovered device, setting roles of transmitting and receiving devices, and logically connecting the devices.

Although an input type of a used device and a format of input data may be changed, if the input type needs to be changed in real time, the speed is slow because it is changed using UPnP. Further, since the input type must be changed through a CP, if there is no CP after connection setup, in the worst case, the input type cannot be changed.

Figure 3:
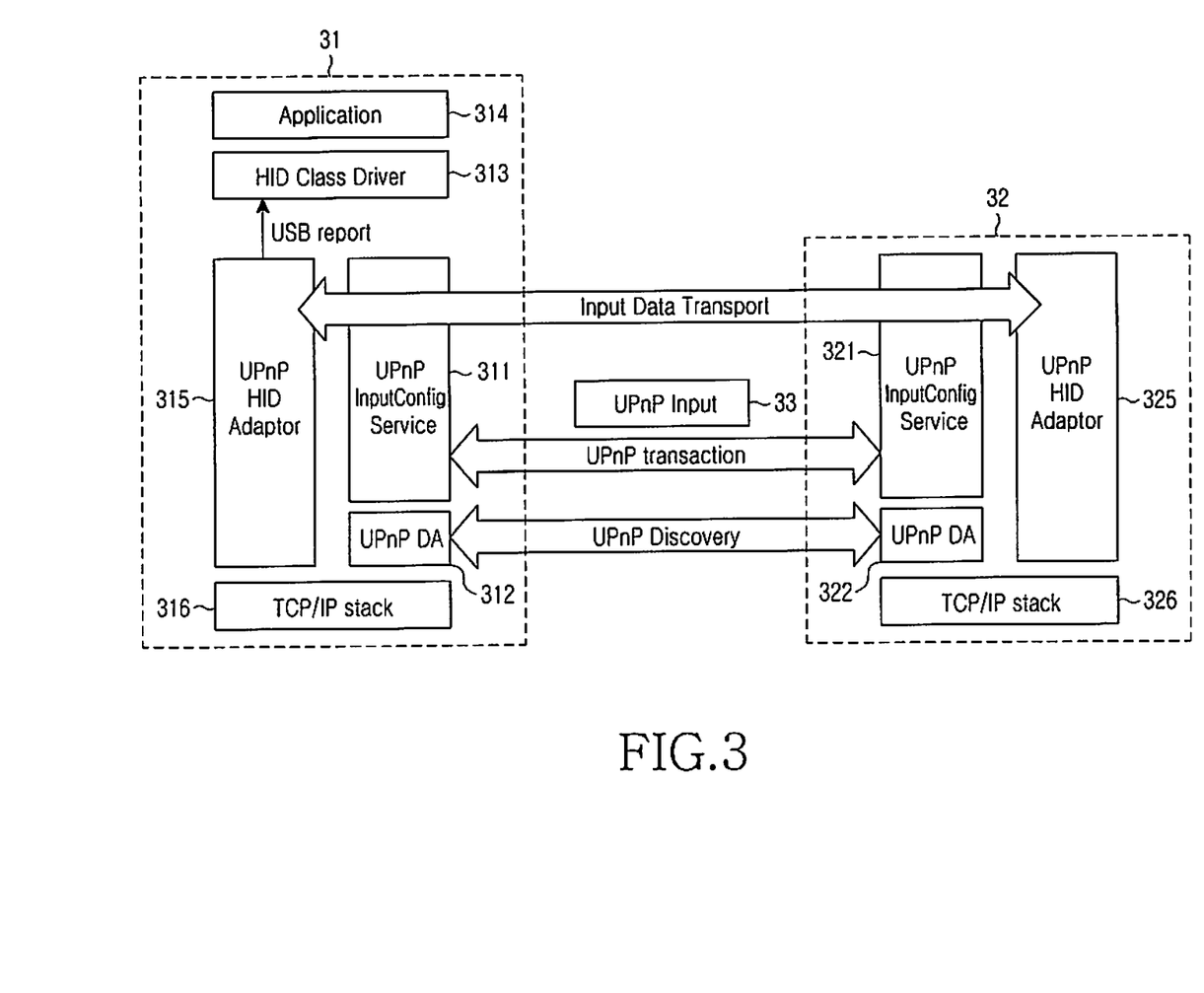
FIG. 3 is a block diagram illustrating an apparatus for changing a transport protocol and format of input data according to an embodiment of the present invention.

FIG. 3 is a block diagram illustrating an apparatus for changing a transport protocol and format of input data according to an embodiment of the present invention.

Referring to FIG. 3, a UPnP input system includes a transmitting input device 32 for directly receiving input data from a user and transmitting the input data to a receiving input device 31, the receiving input device 31 for receiving the input data from the transmitting input device 32 and performing an operation according to the input data, and CP 33 for controlling input devices 31 and 32.

The receiving input device 31 includes a UPnP input configuration service 311, a UPnP Discovery Agent (DA) 312, an HID class driver 313, an application 314, a UPnP HID adaptor 315, and a Transmission Control Protocol/Internet Protocol (TCP/IP) stack 316.

The UPnP input configuration service 311 sets up the receiving input device 31. The UPnP input configuration service 311 includes information related to the capabilities of an input device. For example, the role of the input device and its protocol. The UPnP input configuration service 311 receives setting values from CP 33, internally controls a software module, and changes an input state to a transmitting or receiving state.

The UPnP DA 302 performs UPnP discovery operations of a device and a service.

The HID class driver 313 is a class driver for a USB HID device and can be used universally in various HID devices. The HID class driver 313 receives an input value from the UPnP HID adapter 315 and provides the input value to application 314.

Application 314 refers to a user application such as an Internet Browser installed on the input device 31.

The UPnP HID adapter 315 converts a Bluetooth® HID input value transmitted through a control channel or an interrupt channel, which is set using UPnP into a value which can be used by the USB HID class driver 313.

The TCP/IP stack indicates the layer for TCP/IP communication.

The transmitting input device 32 has the same construction as the above-described receiving input device 31 and therefore a detailed description of it will be omitted.

The present invention provides better functions than the functions offered by a conventional USB or Bluetooth® HID through an input system using UPnP. USB and Bluetooth® use a connection between devices and require their unique interfaces. UPnP operates on the same layer as the IP and thus can transfer an input value through a general IP network. Accordingly, there is no need to provide an additional interface. When a type of necessary input data is changed, a method for changing the type is provided. Namely, if an input type desired by an application of a host device is changed, the same device can transfer input data of a new input type. However, if a universal IP stack is used, speed may become slower. Accordingly, the present invention provides all the functions offered by a conventional Bluetooth® input device and simultaneously provides additional functions such as a change of the input device without any decrease of speed.

Figure 4:
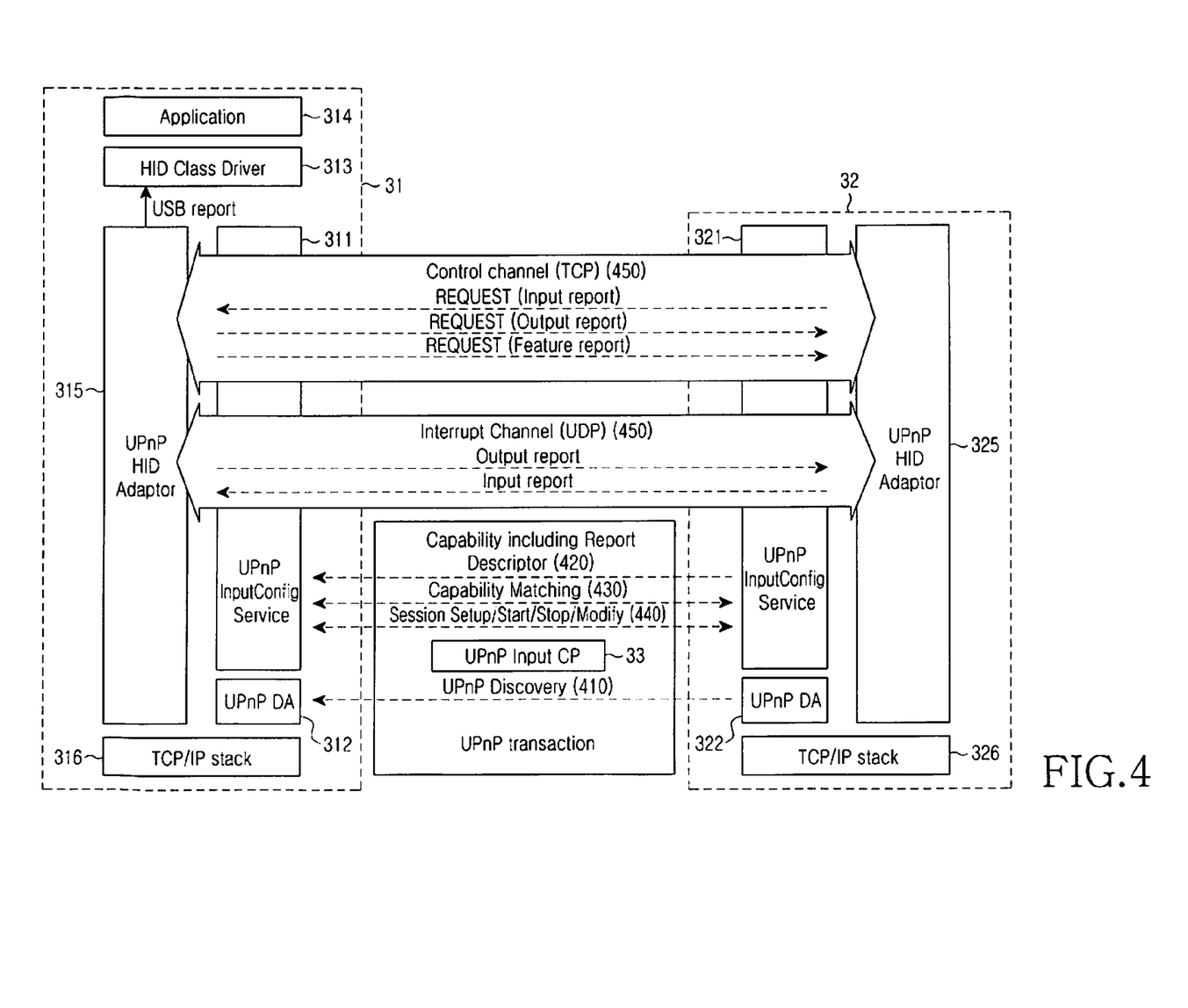
FIG. 4 is a diagram illustrating an operation for transmitting a report descriptor using a UPnP action, according to an embodiment of the present invention.

FIG. 4 is a diagram illustrating an operation for transmitting a report descriptor using a UPnP action according to a first embodiment of the present invention. A UPnP input operation and a report descriptor transfer operation according to an embodiment of the present invention will now be described with reference to FIG. 4.

CP 33 performs a UPnP discovery operation by controlling an input device to discover the input device which is to perform an input operation in step 410.

CP 33 reads capabilities of associated devices received from the UPnP input configuration services 311 and 321 in step 420 and performs capability matching to select an input device in step 430. In this case, a user controls a receiving input device for receiving input information, discovers a transmitting input device, which is to be actually used for input, and selects a device suitable for input. On the contrary, upon controlling an input device, which is to perform actual input, a user may discover and select the receiving input device to for run an application by receiving input data.

According to an embodiment of the present invention, when an input device transmits a capability, a report descriptor may be included in the capability. This will be described in detail below.

CP 33 transmits setting values for session setup to the input configuration services 311 and 321 in step 440. The input configuration services 311 and 321 generate a session using the setting values and prepare an actual session connection.

The transmitting input device 32 checks port information of the receiving input device 31 from connection information transmitted by CP 33 and forms two channels per session in step 450. The connection information refers to connection information of the transmitting input device. The transmitting input device 32 generates a TCP channel used as a control channel for data transmission control and a User Datagram Protocol (UDP) channel used as an interrupt channel for asynchronous data transmission. Meanwhile, when transmitting data, which is security sensitive, a channel protected by a Secure Socket Layer (SSL) may be used instead of a general port. The above two channels are managed by one session ID and input data is transmitted using a request defined in Bluetooth® on the generated channels. A format of the input data conforms to a format described in the shared report descriptor in step 420.

The report descriptor refers to a data structure, which describes a format of input data to be transmitted. The present invention proposes a method for sharing the report descriptor.

According to an embodiment of the present invention, the report descriptor may be shared through a UPnP action as described with reference to FIG. 4. Namely, in step 420, the report descriptor is inserted in the capability when transmitting capability information representing information about an input capability of each input device.

The capability is described in text information in eXtensible Markup Language (XML) form. Since the report descriptor is comprised of information of a binary form, an XML document may be broken when the report descriptor is inserted in the capability. To solve this problem, the report descriptor may be inserted in the XML document by analyzing the meanings of the report descriptor and newly defining XML elements corresponding to respective meanings. Although this method has good readability, it has a disadvantage in that the receiving input device must re-convert the XML into original binary codes through parsing.

Another method for inserting the report descriptor in the XML uses a binary encoding scheme such as Base64. This method has low readability because encoding is not performed in text form but has an advantage in that the parsing and conversion is faster. Using the above-described methods, CP 33 may receive and transmit the report descriptor using a UPnP action.

According to an embodiment of the present invention, the report descriptor is transmitted using TCP communication. The method for transmitting the report descriptor is very intuitive. However, in the case where the report descriptor must be abruptly changed due to a change in an input type, problems may occur.

In this case, since the report descriptor is transmitted through all the UPnP stacks, the processing speed may be slow. If a power source is cut off after CP 33 sets a connection, there is no way to change the report descriptor. In an embodiment of the present invention, the report descriptor is directly transmitted using the TCP channel. In order to change the input device in real time, the receiving input device 31 informs the transmitting input device 32 that a currently demanded input type has been changed, or the transmitting input device 32 should inform the receiving input device 31 that the input type has been changed. In this case, port information to be used may be included in connection information. When transmitting the report descriptor using an associated port, the following two methods may be used.

First, if the receiving input device 31 requests an access to an associated port, CP 33 sets up a session and immediately transmits the report descriptor. If transmission is ended, the corresponding session is ended. If a type and class of an input device have already been determined, the report descriptor may simply be transmitted using the above method. Second, a request for transmitting the report descriptor is defined. Similarly to a Bluetooth® request, a newly defined request is used to request the report descriptor. After receiving the report descriptor, the receiving input device 31 closes an associated channel. This method has an advantage in that the receiving input device 31 may request a new report descriptor at any time when a specific input is needed. A procedure of the request for the new report descriptor is as follows.

It is assumed that an input type needed by the receiving input device 31 is changed into a coordinate input type from a text input type. Then, in order to inform the transmitting input device 32 of a changed input type and receive a report descriptor, the receiving input device 31 requests, using a request shown in the Table 1, shown below, the transmitting input device 32 to transmit the report descriptor. In this case, the receiving input device 31 transmits information about the input type together with information about a USB HID subclass. The input type denotes a simple description representing character input or coordinate input. The USB HID subclass expresses more detailed information. That is, the USB HID subclass represents which subclass provided by USB standard an input device belongs. A new request format is shown in the following Table 1.

TABLE 1

| Field | Size (Bytes) | Description |
| --- | --- | --- |
| Request | 1 | 7 . . . 4 Transaction Type<br>12 = GET_REPORT_DESCRIPTOR<br>3 . . . 0 Reserved |
| Required Input Type | 1 | 7 . . . 6 Input Type indicator<br>0 = USB HID Subclass<br>1 = Vendor Specific Type<br>5 . . . 0 Input Type |

Next, the transmitting input device 32 compares the received request with an input format, which can be provided by the transmitting input device 32 and transmits a report descriptor.

If the transmitting input device 32 cannot transmit input corresponding to the received USB HID subclass, it transmits a default report descriptor of an input type received through a request shown in the following Table 2.

TABLE 2

| Field | Size (Bytes) | Description |
| --- | --- | --- |
| Request | 1 | 7 . . . 4 Transaction Type<br>0 = HANDSHAKErequest<br>3 . . . 0 Result Code<br>0x0 = SUCCESSFUL<br>. . .<br>0x5 = USE_DEFAULT_RD |

If the receiving input device 31 receives the report descriptor, it recognizes a format of input data to be received and prepares a module that can interpret the format.

Meanwhile, the transmitting input device 32 may transmit an input type to be changed to the receiving input device 31. In this regard, the transmitting input device 32 should additionally define a new request that can transmit the changed input type to the receiving input device 31. In the present invention, a request shown in the Table 3, shown below, is defined. The transmitting input device 32 transmits information about an input type to be changed and a report descriptor, using the request defined in Table 3 and may receive a response to the transmitted information and the report descriptor through a handshake request. Therefore, the receiving input device 31 recognizes a format of input data to be received and prepares a module that can interpret the format.

TABLE 3

| Field | Size (Bytes) | Description |
| --- | --- | --- |
| Request | 1 | 7 . . . 4 Transaction Type<br>12 = SET_REPORT_DESCRIPTOR<br>3 . . . 2 Input Type indicator<br>0 = USB HID Subclass<br>1 = Vendor Specific Type<br>1 . . . 0 Reserved |
| Report Descriptor | N | Report Descriptor for receiver |

Figure 5:
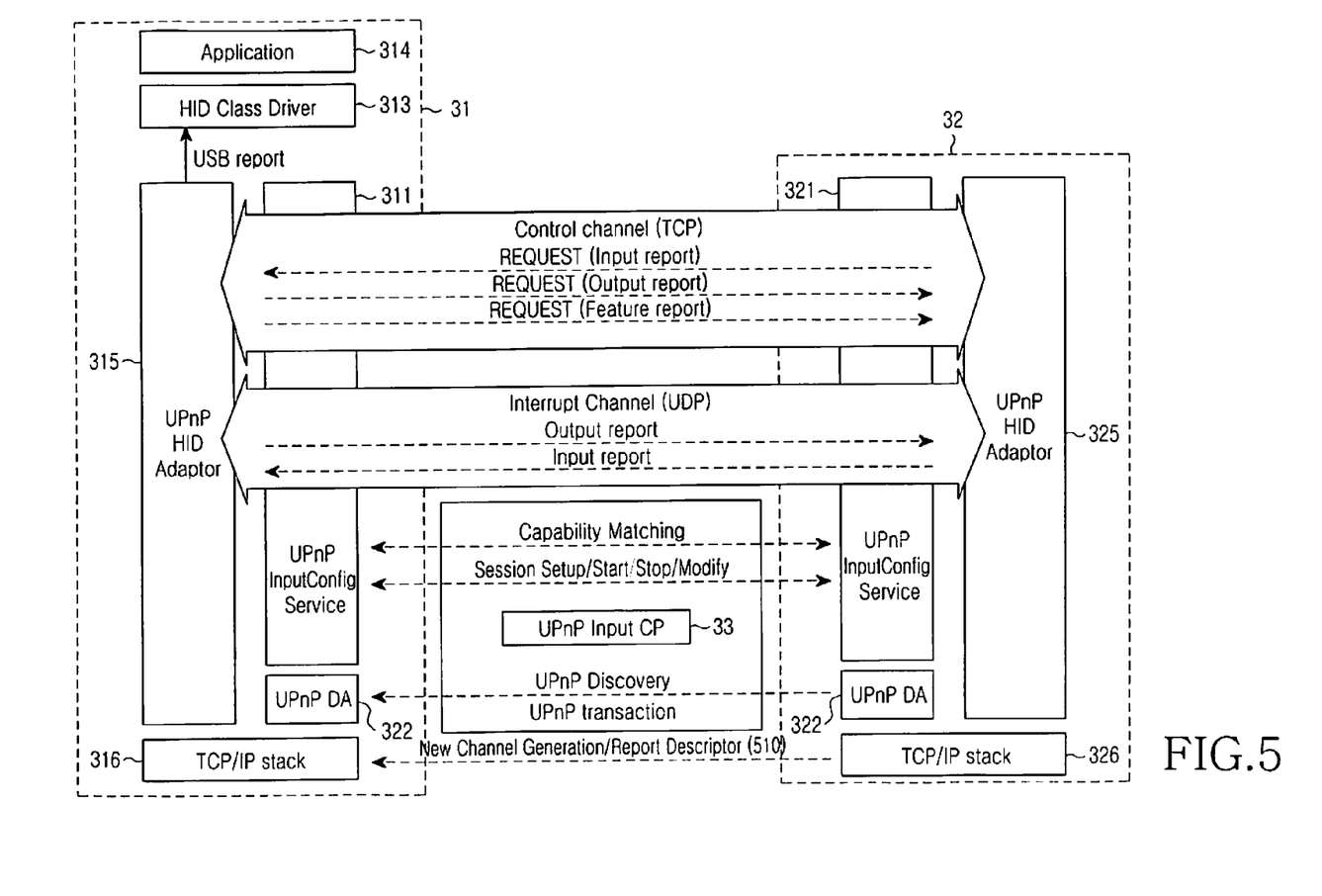
FIG. 5 is a diagram illustrating an operation for transmitting a report descriptor using a TCP channel, according to an embodiment of the present invention.

FIG. 5 is a diagram illustrating an operation for transmitting a report descriptor using a TCP channel according to a second embodiment of the present invention. As illustrated in FIG. 5, if an input type is changed, the transmitting input device 310 may transmit a report descriptor using TCP communication through a TCP/IP stack in step 510.

According to a third embodiment of the present invention, a Bluetooth® request is added and a report descriptor is transmitted using a control channel which is used when transmitting input data.

Namely, the third embodiment of the present invention is similar to the second embodiment but the report descriptor is transmitted using an existing control channel used when transmitting input data instead of a new channel.

Figure 6:
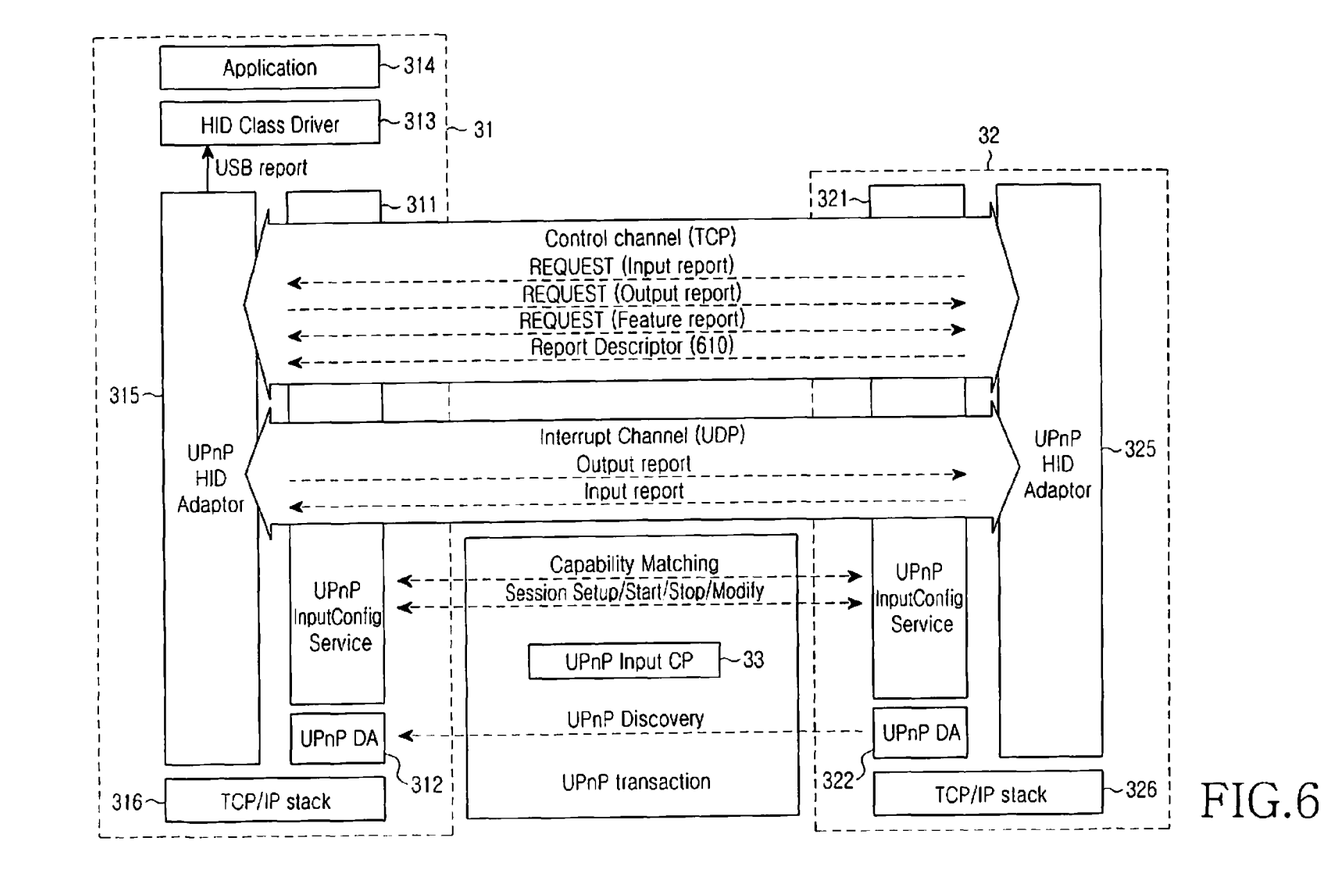
FIG. 6 is a diagram illustrating an operation for transmitting a report descriptor using a Bluetooth® request, according to an embodiment of the present invention.

FIG. 6 is a diagram illustrating an operation for transmitting a report descriptor using a Bluetooth® request according to the third embodiment of the present invention. As illustrated in FIG. 6, the transmitting input device may transmit the report descriptor through a control channel using an added Bluetooth® request in step 610.

Figure 7:
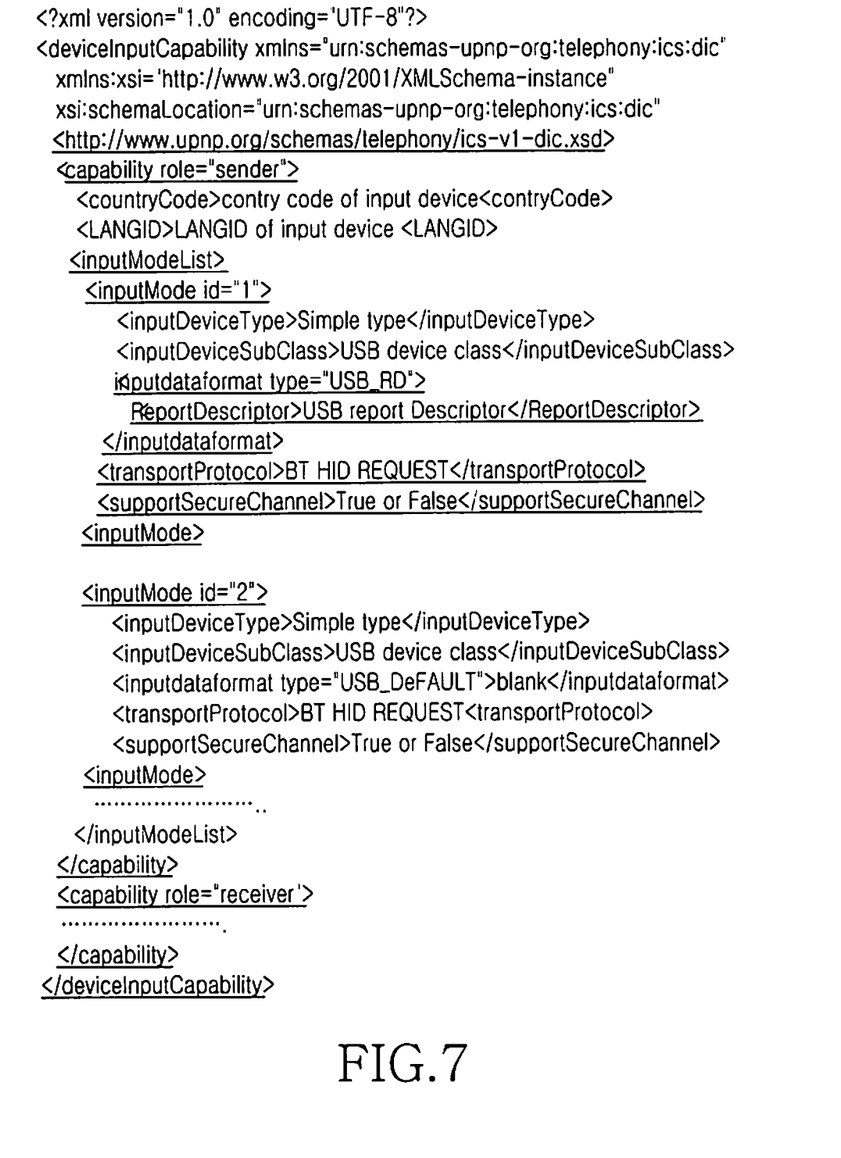
FIG. 7 is a diagram illustrating a changed capability description according to an embodiment of the present invention.

A data structure of a UPnP state variable will now be described in reference to FIG. 7. FIG. 7 is a diagram illustrating an example of a changed capability description, according to an embodiment of the present invention. As illustrated in FIG. 7, report descriptor information is included in a capability and a Bluetooth® HID scheme is used as a transport protocol. If a previously defined report descriptor is used as a format of input data, a USB_DEFAULT value is assigned to type information of an input data format. Accordingly, communication can be performed using the report descriptor defined above without describing the report descriptor.

Figure 8:
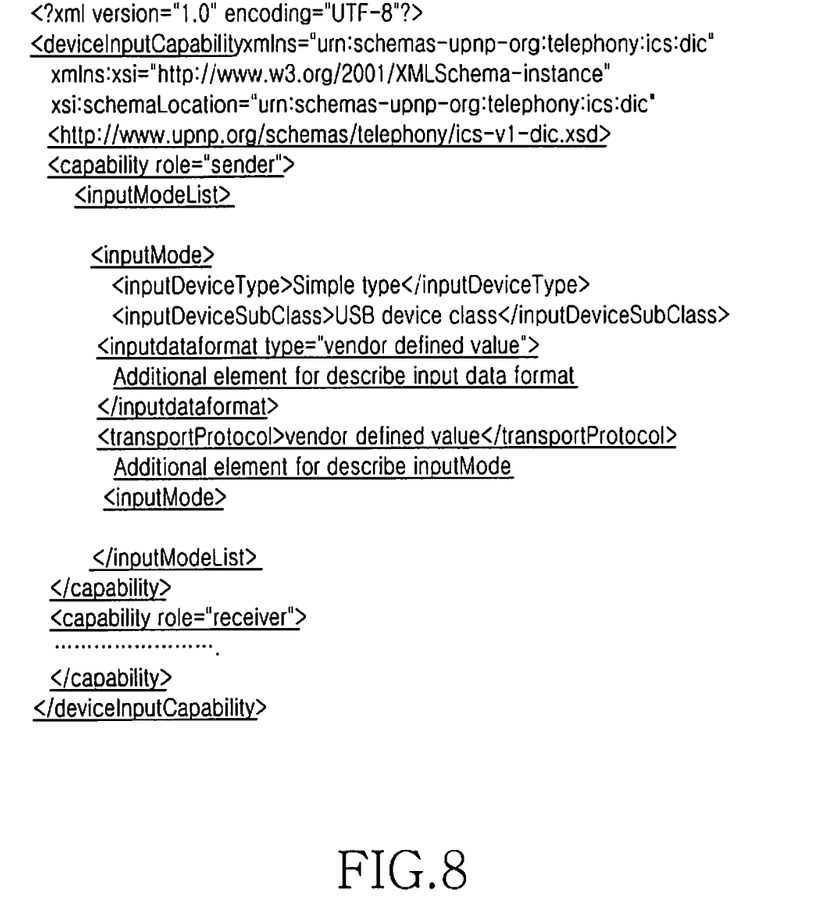
FIG. 8 is a diagram illustrating an extended capability description according to an embodiment of the present invention.

FIG. 8 is a diagram illustrating an example of an extended capability description according to an embodiment of the present invention. In FIG. 8, an example of capability information is shown when a manufacturer designates an input data format and a transport protocol.

Figure 9:
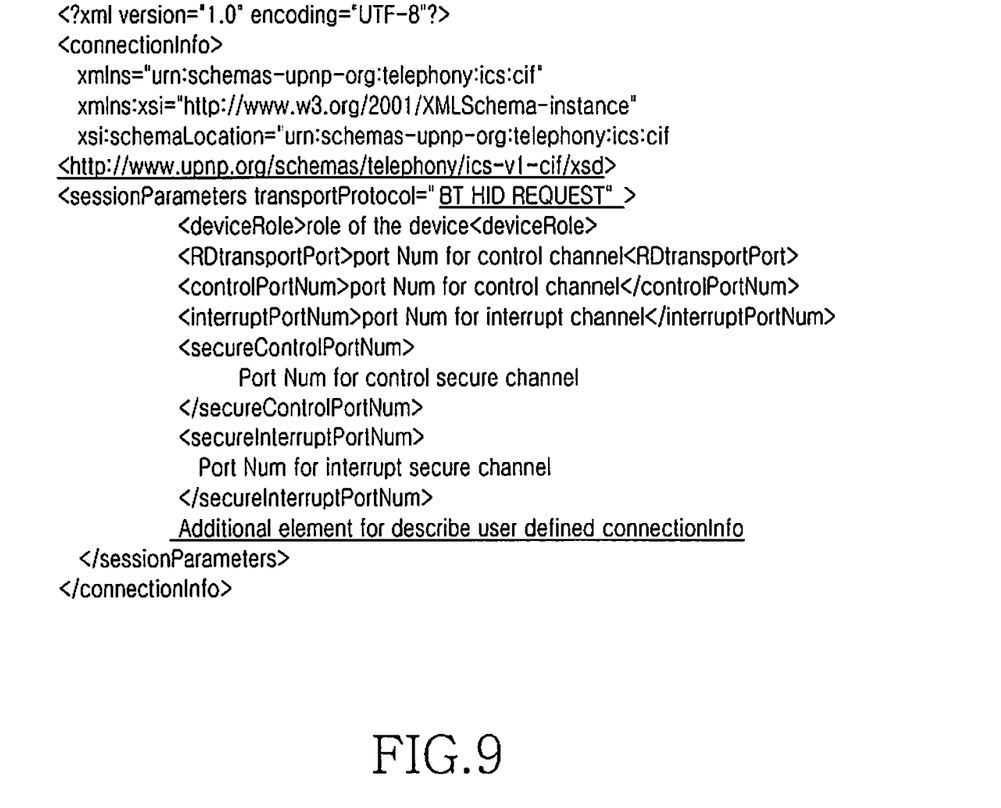
FIG. 9 is a diagram illustrating changed connection information according to an embodiment of the present invention.

FIG. 9 is a diagram illustrating an example of changed connection information according to an embodiment of the present invention. In FIG. 9, an example of connection information including port information for generating a control channel and an interrupt channel and transmitting a report descriptor is shown.

Figure 10:
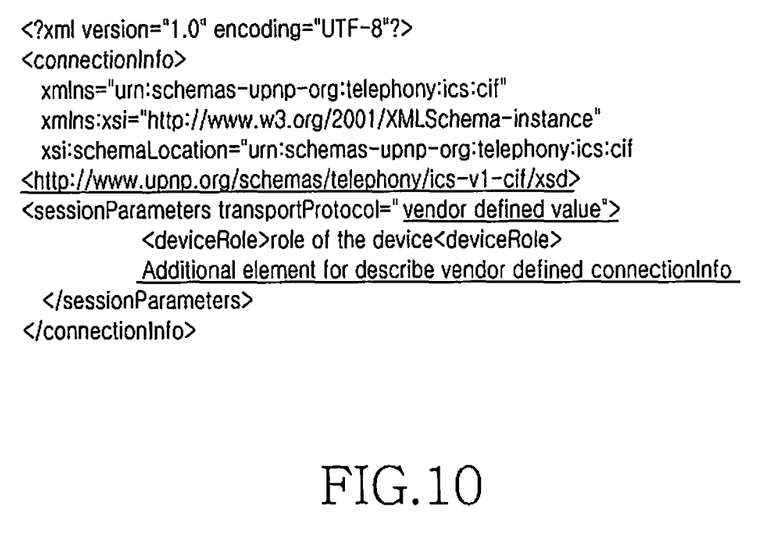
FIG. 10 is a diagram illustrating extended connection information according to another embodiment of the present invention.

FIG. 10 is a diagram illustrating an example of extended connection information according to another embodiment of the present invention. In FIG. 10, an example of connection information is shown when a manufacturer designates an input data format and a transport protocol.

According to embodiments of the present invention, in an input system using UPnP, a specific type of an input device can be changed into another input type while performing input. Moreover, when changing an input type, an existing USB class driver can be reused, thereby making development more efficient.

Furthermore, a software module used in Bluetooth® can be reused using a Bluetooth® HID transport protocol and an input type in a TCP level can be changed. In case of security information such as credit card information, security setup is possible depending on a preference of a user.

As described above, the operation and construction of a method and apparatus for changing an input type in an input system using UPnP can be implemented.

Although the embodiments of the present invention have been disclosed for illustrative purposes, various modifications, additions and substitutions are possible, without departing from the scope and spirit of the invention as disclosed in the accompanying claims. Accordingly, the scope of the present invention should not be limited to the description of the embodiments, but defined by the accompanying claims and equivalents thereof.

What is claimed is:

1. A method for changing an input type by a receiving input device in an input system using Universal Plug and Play (UPnP), comprising:
   receiving input data corresponding to a first input type from a transmitting input device; and
   if the first input type is changed to a second input type, informing the transmitting input device of the second input type, and receiving a report descriptor including information about a format of input data according to the second input type from the transmitting input device,
wherein the receiving input device uses the first input type and the second input type.

2. The method of claim 1, further comprising requesting input capability information that includes the report descriptor including the information about the format of input data.

3. The method of claim 2, wherein the input capability information includes the report descriptor defined by eXtensible Markup Language (XML) elements.

4. The method of claim 2, wherein the input capability information includes an encoded report descriptor.

5. The method of claim 1, wherein receiving input data comprises receiving the input data using a request defined in Bluetooth®.

6. The method of claim 1, wherein receiving the report descriptor comprises:
receiving information about the second input type from the transmitting input device, and transmitting the report descriptor including information about the format of input data to the transmitting input device through a generated session.

7. The method of claim 1, wherein receiving the report descriptor comprises:
receiving a request for the report descriptor according to the second input type from the transmitting input device, and transmitting the report descriptor including information about the format of input data according to the second input type to the transmitting input device through a generated Transmission Control Protocol (TCP) channel.

8. The method of claim 7, wherein the request for the report descriptor according to the second input type includes an input type including information about an input format and includes Universal Serial Bus Human Interface Device (USB HID) subclass information.

9. The method of claim 1, wherein receiving the report descriptor comprises:
receiving a request for the report descriptor according to the second input type from the transmitting input device and transmitting the report descriptor including information about the format of input data according to the second input type to the transmitting input device through a control channel.

10. A receiving input device in an input system, comprising:
a receiving unit configured to receive input data corresponding to a first input type from a transmitting input device using Universal Plug and Play (UPnP); and
if the first input type is changed to a second input type, a processor configured to inform the transmitting input device of the second input type and to control receiving a report descriptor including information about a format of input data according to the second input type from the transmitting input device,
wherein the receiving input device uses the first input type and the second input type.

11. The receiving input device of claim 10, further comprising:
an input configuration service configured to provide input capability information, and to receive setting values from a control point to change a state to an input transmitting or receiving state;
a discovery agent configured to perform discovery operations of an input device and a service;
a Human Interface Device (HID) class driver configured to receive input data from a UPnP HID adapter and transmit the input data to an application; and
a HID adapter configured to convert Bluetooth® HID input data received through a control channel or an interrupt channel that is set into a value which can be used by a USB HID class driver.

12. The receiving input device of claim 11, wherein the input capability information includes the report descriptor defined by eXtensible Markup Language (XML) elements.

13. The receiving input device of claim 11, wherein the input capability information includes an encoded report descriptor.

14. The receiving input device of claim 10, wherein the receiving unit receives input data using a request defined in Bluetooth® from the transmitting input device.

15. The receiving input device of claim 10, wherein receiving the report descriptor comprises:
receiving information about the second input type from the transmitting input device, and transmitting the report descriptor including information about the format of input data to the transmitting input device through a generated session.

16. The receiving input device of claim 10, wherein receiving the report descriptor comprises:
receiving a request for the report descriptor according to the second input type from the transmitting input device and transmitting the report descriptor including information about the format of input data according to the second input type to the transmitting input device through a generated Transmission Control Protocol (TCP) channel.

17. The receiving input device of claim 16, wherein the request for the report descriptor according to the second input type includes an input type including information about an input format and includes Universal Serial Bus Human Interface Device (USB HID) subclass information.

18. The receiving input device of claim 10, wherein receiving the report descriptor comprises:
receiving a request for the report descriptor according to the second input type from the transmitting input device and transmitting the report descriptor including information about the format of input data according to the second input type to the transmitting input device through a control channel.

* * * * *